(12) United States Patent
McDonald et al.

(10) Patent No.: US 6,757,456 B2
(45) Date of Patent: Jun. 29, 2004

(54) SYSTEM FOR SELECTING AN APPROPRIATE OPTICAL FIBER TYPE FOR A COMMUNICATION NETWORK

(75) Inventors: Michael A. McDonald, Painted Post, NY (US); Kendall D. Musgrove, Horseheads, NY (US); Robert J. Whitman, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 301 days.

(21) Appl. No.: 09/884,643

(22) Filed: Jun. 19, 2001

(65) Prior Publication Data

US 2002/0191946 A1 Dec. 19, 2002

(51) Int. Cl.[7] .............................. G02B 6/26; H04B 10/08
(52) U.S. Cl. .............................. 385/16; 385/15; 385/24; 385/123; 398/25; 398/28; 398/29; 398/30
(58) Field of Search .............................. 385/15, 16, 17, 385/18, 24, 123, 147; 398/25, 28, 29, 30

(56) References Cited

U.S. PATENT DOCUMENTS

| | | | | |
|---|---|---|---|---|
| 4,911,515 A | * | 3/1990 | So et al. ......................... | 398/28 |
| 5,319,482 A | * | 6/1994 | Tsuchiya et al. ............... | 398/31 |
| 5,353,147 A | * | 10/1994 | Grimes .......................... | 398/28 |
| 5,534,994 A | | 7/1996 | Hanson et al. ................. | 356/73.1 |
| 5,710,887 A | | 1/1998 | Chelliah et al. ............... | 395/226 |
| 5,808,761 A | * | 9/1998 | Stewart .......................... | 398/28 |
| 6,067,150 A | * | 5/2000 | Beller et al. ................... | 356/73.1 |
| 6,522,434 B1 | * | 2/2003 | Jennings et al. .............. | 398/28 |

FOREIGN PATENT DOCUMENTS

EP          0 410 036          1/1991          ........... G06F/15/40

OTHER PUBLICATIONS

Dennis et. el., U.S. patent application Publication No. U.S. 2003/0031440 A1, published Feb. 13, 2003.*
A. Filippelli et al., "An effective design approach for FTTx solutions", Broadband Access and Technology, D.W. Faulkner and A.L. Harmer (Eds.), IOS Press, 1999, pp. 79–84.

* cited by examiner

Primary Examiner—Brian M. Healy
(74) Attorney, Agent, or Firm—Robert L. Carlson (57) ABSTRACT

An optical fiber selection system automatically recommends an appropriate optical fiber type for a communication network, based on input from a user. In one embodiment, the system includes a user computer system that is in communication with a vendor computer system. The vendor computer system executes code and performs a number of steps. Initially, the vendor computer system receives at least one technical parameter associated with the proposed communication network from the user, via the user computer system. Next, the vendor computer system automatically selects an optical fiber type for the communication network based on the least one technical parameter. Finally, the vendor computer system provides the selected optical fiber type to the user, via the user computer system.

23 Claims, 8 Drawing Sheets

PRODUCT DESIGN TOOLS
Fiber Selection Guide
Dispersion Calculators
Spectral Attenuation Calculators
Splicing performance Information

MANUFACTURER FIBER INFORMATION
Where to Buy
Product Information Sheets

REFERENCE LIBRARY
FAQs
Other Fiber Links

CONTACT CENTER
Contact us
Your Manufacturer Team

FIBER SELECTION GUIDE
Enter the essential parameters of your network into the fiber selection tool and it will return a recommendation of the best fiber for your network based on our network economic and system performance analysis.

Choose the type of network of interest to you.

| Network Type | Example | Products for Consideration |
|---|---|---|
| •Metropolitan | Regional rings down to and including business access rings. Usually 40-400 km size rings. | LEAF®, MetroCor™, SMF-28™ |
| •Long Haul | Long distance, high data rates. Nationwide backbone. Usually 350 + km lengths | LEAF®, SMF-28™ |

PRODUCT DESIGN TOOLS
Fiber Selection Guide
Dispersion Calculators
Spectral Attenuation Calculators
Splicing performance Information

MANUFACTURER FIBER INFORMATION
Where to Buy
Product Information Sheets

REFERENCE LIBRARY
FAQs
Other Fiber Links

CONTACT CENTER
Contact us
Your Manufacturer Team

METROPOLITAN NETWORK TYPE
Please input your network parameters
Choose the closest that apply.

Interoffice Ring (IOF) circumference

[0 - 80 km ▼] Metric    [0 - 50 mi] Standard Equivalent

Typical N. American value is 120 km. For quick calculation, multiply cross-town distance by 3 (or pi).

Number of Office Business Rings

[0 ▼]

Business access rings are the smaller sub-rings that come off the main IOF ring to serve main business districts.

Business Access Ring Circumference

[0 - 20 km ▼] Metric    [0 - 10 mi] Standard Equivalent

Typical N. American value is 20 km. For quick calculation, multiply area's end to end distance by 3 (or pi).

Channel Plan

[WDM ▼]

Single Channel or Wavelength Division Multiplexing ( Previous )    ( Next )

PRODUCT DESIGN TOOLS
Fiber Selection Guide
Dispersion Calculators
Spectral Attenuation Calculators
Splicing performance Information

MANUFACTURER FIBER INFORMATION
Where to Buy
Product Information Sheets

REFERENCE LIBRARY
FAQs
Other Fiber Links

CONTACT CENTER
Contact us
Your Manufacturer Team

402

Choose an initial TDM rate

[ 2.5 Gbps ▼ ]

Typical rate for metro DWDM applications is 2.5 Gbps.

Choose a future TDM upgrade rate, if applicable

[ No upgrade ▼ ]

Choose an initial "lit" channel count

[ 4 ▼ ]

Typical value ranges from 4-32.

Choose a maximum channel count per fiber pair

[ 16 ▼ ]

Typical value is 32 or 40.

Choose an estimated fiber count

[ 96 ▼ ]

Fiber counts are market dependent; values typically range from 144 - 864

( Previous )    ( Next )

FIG. 4B

PRODUCT DESIGN TOOLS
Fiber Selection Guide
Dispersion Calculators
Spectral Attenuation Calculators
Splicing performance Information

MANUFACTURER FIBER INFORMATION
Where to Buy
Product Information Sheets

REFERENCE LIBRARY
FAQs
Other Fiber Links

CONTACT CENTER
Contact us
Your Manufacturer Team

Long Haul Network Type
Please select the parameters of your network.
Choose the closet that apply.

Average unregenerated link length
[<=400 km ▼] Metric  [<=250 mi] Standard Equivalent
Conservative equipment providers suggest 450 km link. Technology exists to extend this length.

Number of Links
[10 ▲▼]
Typical range from 1-20.

Based on your inputs we have estimated a route distance of 4000 km (2500 miles).

TDM rate
[2.5 Gbps ▼]
Currently most long distance carriers deploy 10 Gbps systems.

Choose a future TDM rate, if applicable.
[No upgrade ▼]

Initial Channel Count   Initial Cable Capacity
[4 ▼]                        [10 Gbps]
Typical values range from 1 - 10.

Maximum Channel Count (per fiber)
[16 ▼]
Maximum values range from 32 -160.

Numbers of fibers in cable      Maximum Cable Capacity
[144 ▲▼] If number values by span, use average    [1440 Gbps]
Typical long haul fiber counts range from 48-144.
One-way throughput. Assumes 1:1 protection and unidirectional traffic (Previous)   (Next)

FIG. 5

SYSTEM FOR SELECTING AN APPROPRIATE OPTICAL FIBER TYPE FOR A COMMUNICATION NETWORK

BACKGROUND OF THE INVENTION

1. Field of the Invention

The present invention is generally directed to optical fiber communication networks and, more specifically, to the selection of an appropriate optical fiber type for a communication network.

2. Technical Background

Designers of optical fiber communication networks are required to select an appropriate optical fiber type for a particular communication network. Frequently, a decision on what optical fiber type is appropriate has required multiple discussions with optical fiber manufacturers. Thus, designers have typically contacted various manufacturers of optical fibers and, after receiving and reviewing the specifications for available optical fibers, have decided upon an appropriate optical fiber type for the communication network. This process frequently requires discussions on the communication network requirements with a customer representative of the optical fiber manufacturer, which are generally time consuming and expensive for both the customer and the optical fiber manufacturer. Further, the designers of a communication network have typically had to understand and access different technical parameters on various optical fiber types to determine an appropriate fiber type that adequately functions with other optical devices (e.g., optical amplifiers) specified for the network.

As mentioned above, a representative of an optical fiber manufacturer has typically supplied various information such that the designers, in conjunction with the customer representative, could determine an appropriate optical fiber type for a communication network. Frequently, there are undesirable delays between a customer requesting information and receiving the information from a vendor. Because various optical fiber types have different optical properties, e.g., dispersion and attenuation characteristics, it is desirable for the designers to have ready access to the optical specifications for various available optical fiber types under consideration, when designing a communication network.

Therefore, there exists a need for an electronically accessible system that automatically recommends an optical fiber type for a communication network, based upon at least one technical parameter provided by a designer. It would also be desirable to provide customer/designer electronically accessible dispersion and attenuation information for optical fiber types available from a vendor.

SUMMARY OF THE INVENTION

An embodiment of the present invention is directed to an optical fiber selection system that automatically selects an appropriate optical fiber type for a proposed communication network, based on input from a user. In one embodiment, the system includes a user computer system that is in communication with a vendor computer system. The vendor computer system executes code and performs a number of steps. Initially, the vendor computer system receives at least one technical parameter associated with the proposed communication network from the user, via the computer system. Next, the vendor computer system automatically selects an optical fiber type for the communication network, based on the least one technical parameter. Finally, the vendor computer system provides the selected optical fiber type to the user, via the user computer system.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT(S)

According to an embodiment of the present invention, a fiber selection guide of a product design tool automatically selects an optical fiber type for a proposed communication network, based on at least one technical parameter entered into the guide by a user (e.g., a potential customer of an optical fiber manufacturer). In a preferred embodiment, the user accesses a vendor (e.g., a manufacturer) computer system, via an Internet connection, and after inputting (e.g., selecting) one or more technical parameters the user is provided with a selected optical fiber type for the communication network. It should be appreciated that the vendor computer system may also be remotely accessed through a dial-up connection or locally accessed via, for example, a local area network (LAN). In another embodiment, the product design tool also electronically provides dispersion and attenuation information for available optical fiber types.

Figure 1:
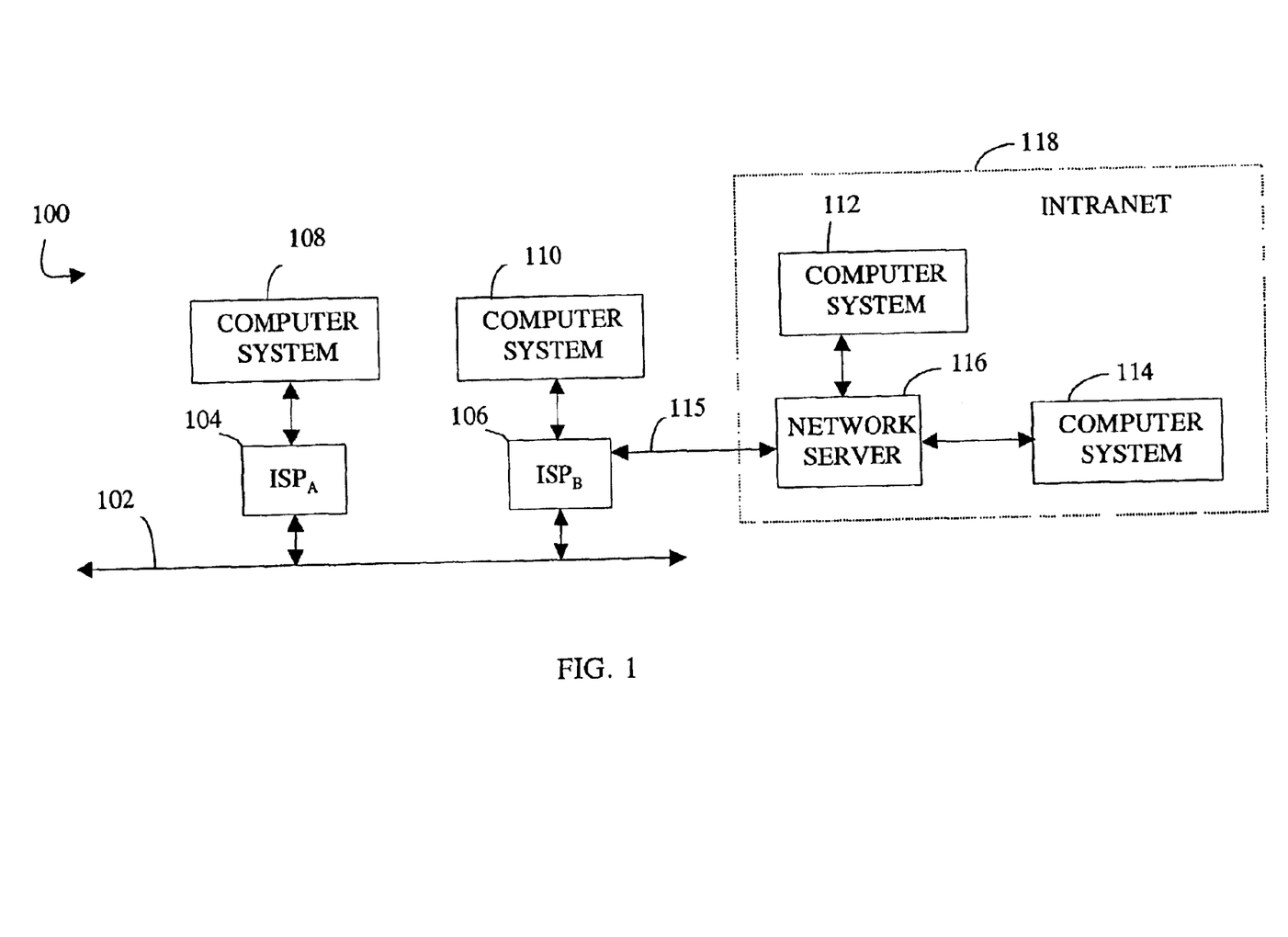
FIG. 1 is an electrical block diagram of an exemplary computer network, employed in practicing the invention.

Turning to FIG. 1, an exemplary computer network 100 is depicted. The exemplary computer network 100 includes four computer systems 108, 110, 112, and 114 that may communicate with a network server 116, located within an intranet 118 (e.g., a manufacturer LAN or metropolitan area network (MAN)). According to the present invention, the network server 116 implements code, which provides numerous web pages, which facilitate communication between the network server 116 and a user of one or more of the computer systems 108–114. As shown in FIG. 1, the computer system 108 is coupled to an Internet service provider ($ISP_A$) 104, via, for example, a T1 line and the computer system 110 is coupled to an Internet service provider ($ISP_B$) 106, via, for example, a cable modem. The Internet service providers $ISP_A$ 104 and $ISP_B$ 106 are coupled to a communication link 102 (e.g., a public switched telephone network (PSTN)), which forms part of the computer network. The link 102 may, however, take other forms, such as broadband, cable, wireless, etc. As shown, the network server 116, of the intranet 118, is also coupled to $ISP_B$ 106, via link 115 which is, for example, a T1 line. In this manner, the computer systems 108 and 110 can communicate with the network server 116 or computer systems 112 and 114, via the network server 116. Any of the computer systems 108–114 may represent a user (e.g., an external or internal customer) computer system that is in communication with the network server 116.

According to the present invention, the network server (e.g., a vendor computer system) 116 implements code, which allows the network server 116 to communicate with the user computer system 108, as well as other computer systems. According to the present invention, the network server 116 also implements fiber selection code, which allows the network server 116 to perform a number of steps. Initially, the network server 116 receives at least one technical parameter associated with a proposed optical communication network from a user via, for example, the user computer system 108. Next, the code running on the network server 116 automatically selects an optical fiber type for the proposed communication network, based on the at least one technical parameter received from the user. Finally, the network server 116 provides the selected optical fiber type to the user via, for example, the user computer system 108.

According to another embodiment of the present invention, the network server 116 can receive a network modeling request from the user. According to still another embodiment of the present invention, the code running on the network server 116 can provide at least one of a wavelength dependent dispersion value, a graph of dispersion over a wavelength range and a specification for the selected optical fiber type to the user. According to yet another embodiment of the present invention, the code of the network server 116 is also configured to provide at least one of a wavelength dependent attenuation value, a graph of attenuation over a wavelength range and a specification for the selected optical fiber type to the user.

The computer system 108 may be that of a competitive local exchange carrier (CLEC), a communication carrier, other service provider or of any other user that would benefit from accessing the product design tool. When communicating with the network server 116, a user at the computer system 108 generally provides at least one technical parameter to the network server 116 (e.g., by selecting an appropriate value), such that an optical fiber selection routine, executing on the network server 116, can select an appropriate optical fiber type. The technical parameters may include a network type, a network length, a network channel plan, a network data rate, a network upgrade data rate, an initial active network channel count, a maximum channel count, an optical fiber count, an average unregenerated link length and a link count. It should be appreciated that other parameters can be utilized, depending on the selection algorithm implemented by the fiber selection routine.

While the computer system 108 preferably accesses the network server 116, via the Internet, it should be appreciated that the network server 116 may be locally accessed by a user through the computer systems 112 and 114 (e.g., through a local area network (LAN)) or may be accessed by another computer system through a dial-up connection or through a remote terminal (e.g., a laptop computer) with the code stored on a compact disk read-only memory (CD-ROM) accessed via a CD-ROM drive of the remote terminal. Preferably, the network server 116 includes a database (stored on a mass storage device) that stores information on a plurality of optical fiber types. However, it is contemplated that the computer system 114 may be a file server that communicates with the network server 116 and stores the various technical parameters on a plurality of optical fiber types in a database. As previously mentioned, communication between the network server 116 and the computer systems 108–114 is preferably facilitated by the plurality of web pages.

Figure 2A:
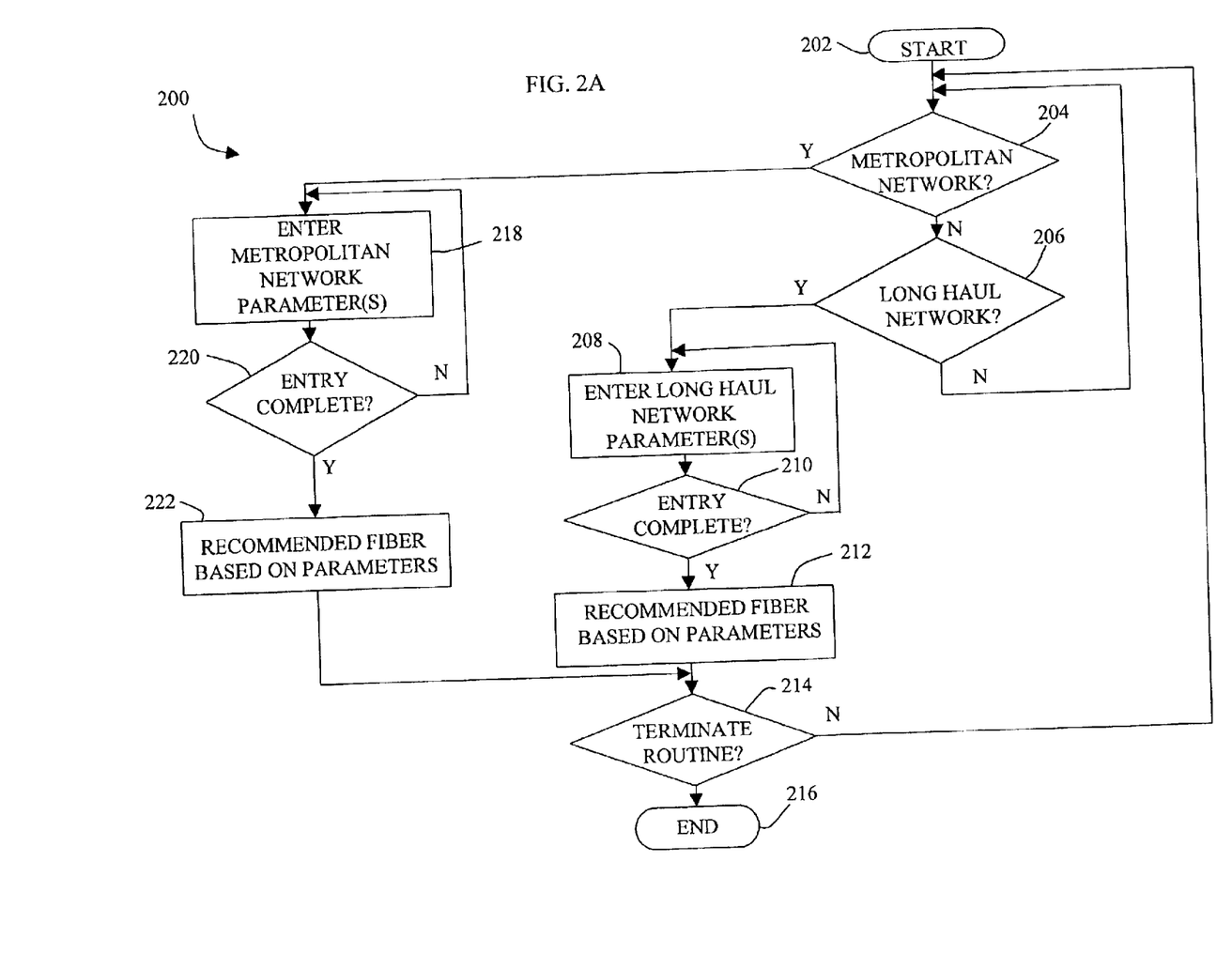
FIG. 2A is a flow diagram of an optical fiber selection routine, according to an embodiment of the present invention.

FIG. 2A depicts an exemplary optical fiber selection routine 200 for selecting an appropriate optical fiber type for a communication network. The routine 200 is initiated in step 202, at which point control transfers to decision step 204. In step 204, the routine 200 determines whether a metropolitan network has been selected. If so, control transfers from step 204 to step 218. Otherwise, control transfers from step 204 to decision step 206. In step 206, the routine 200 determines whether a long haul network has been selected. If so, control transfers from step 206 to step 208. Otherwise, control transfers from step 206 to step 204. In step 208, the routine 200 allows a user to enter (e.g., select) various long haul network parameters.

Next, in decision step 210, the routine 200 determines whether the entry of the long haul network parameters is complete. If so, control transfers from step 210 to step 212. Otherwise, control loops to step 208. In step 212, the routine 200 utilizes the entered network parameters to recommend an optical fiber type. Next, in decision step 214, the routine 200 determines whether the user has chosen to terminate the routine. If so, control transfers from step 214 to step 216 where the routine 200 ends. Otherwise, control transfers from step 214 to step 204.

In step 204, when the metropolitan network is selected by a user, control transfers to step 218. In step 218, the routine 200 allows a user to change various metropolitan network parameters. Next, in decision step 220, the routine 200 determines whether the entry of the metropolitan network parameters is complete. If so, control transfers from step 220 to step 222. Otherwise, control loops to step 218. In step 222, the routine 200 utilizes the entered metropolitan network parameters to recommend an optical fiber type. Next, control transfers from step 222 to step 214. Thus, an optical fiber selection routine has been described that allows a user to choose a particular network type (i.e., a metropolitan or long haul) and enter associated network parameters that are used by the routine to recommend an appropriate optical fiber type.

Figure 2B:
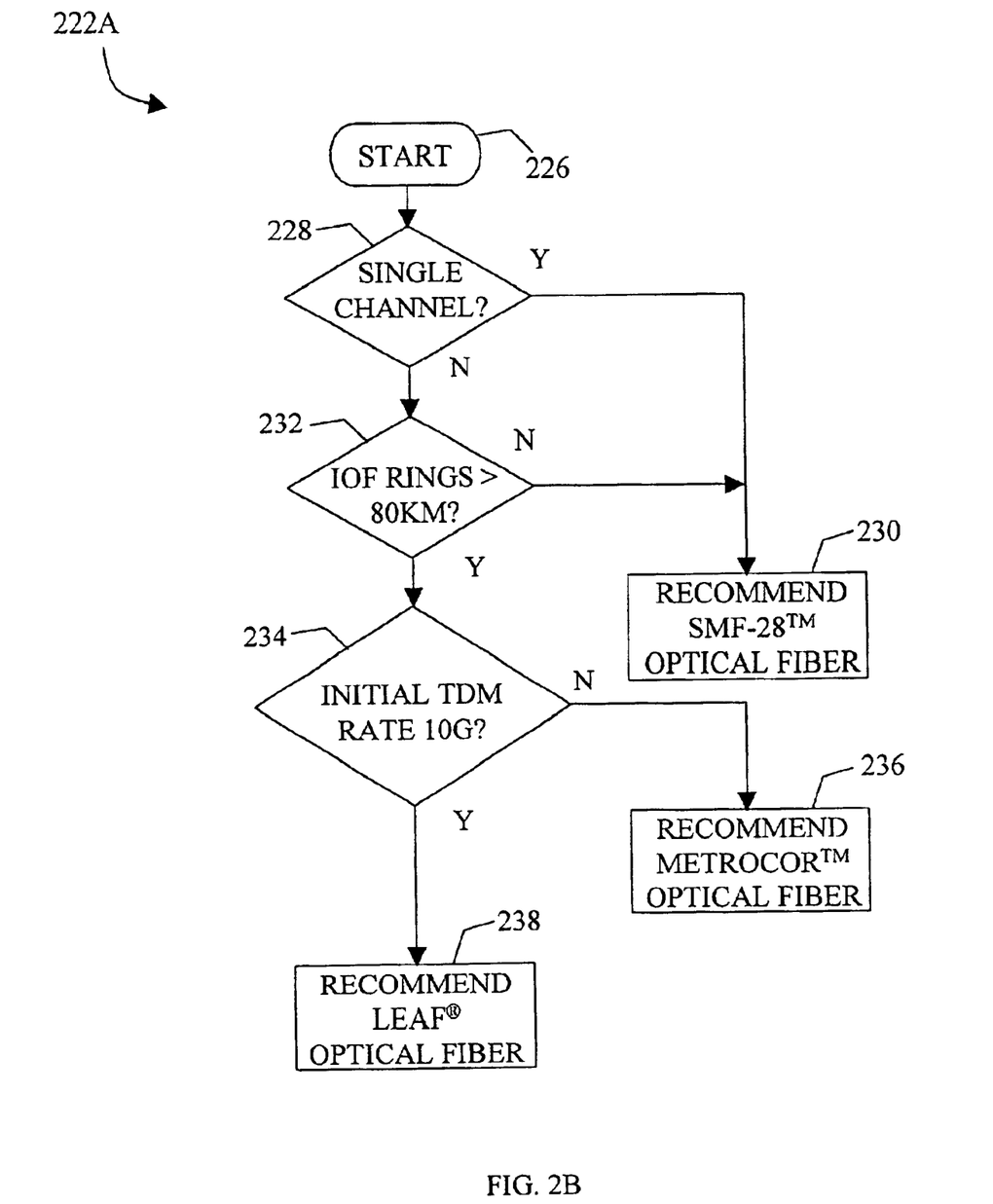
FIGS. 2B–2C are flow diagrams further depicting how the routine of FIG. 2A selects an appropriate optical fiber for a metropolitan and a long haul network, respectively.
Figure 2C:
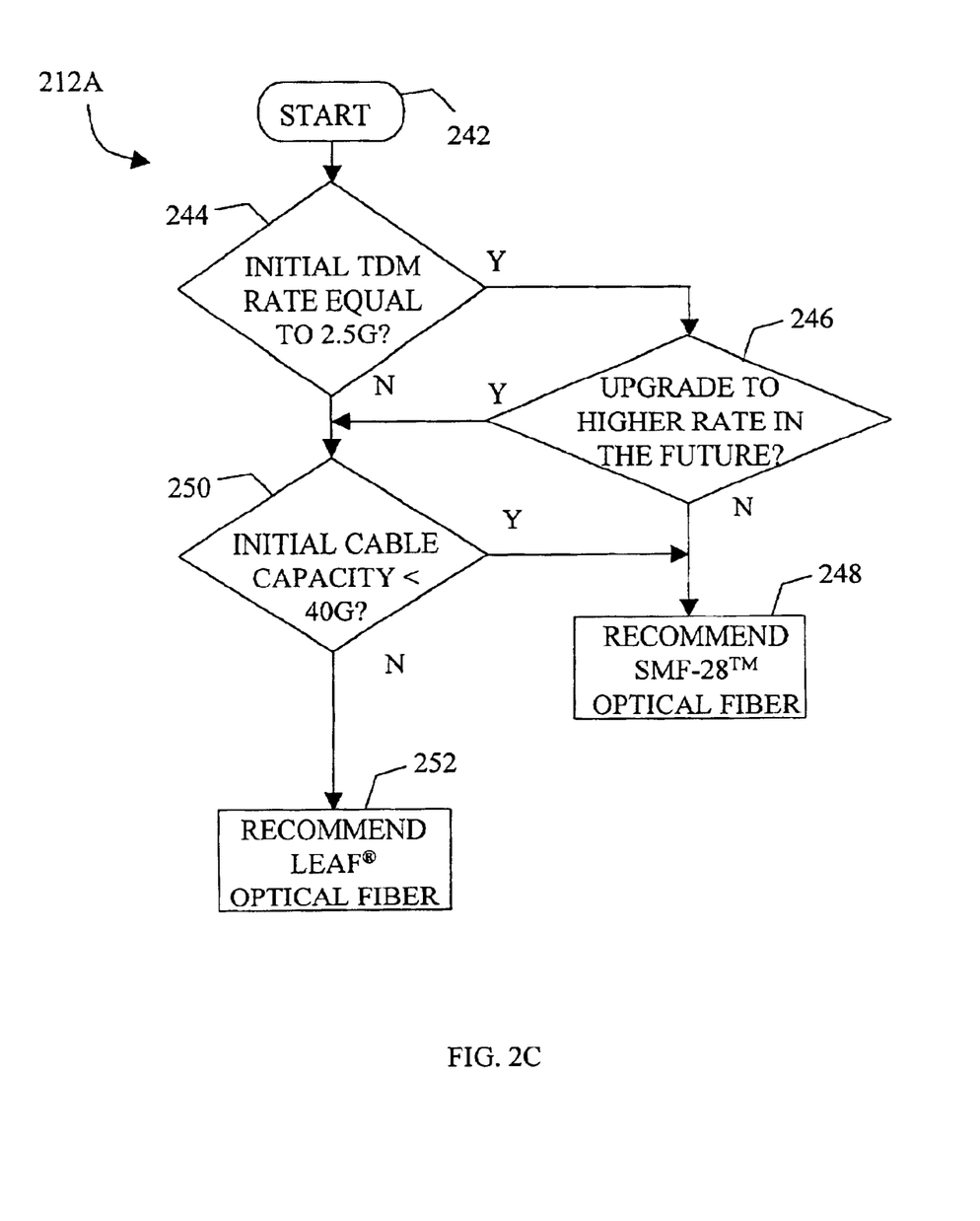

A flow diagram further illustrating an exemplary method for recommending an appropriate optical fiber type, as set forth in steps 212 and 222, based on input from a user, is set forth in FIGS. 2B and 2C, respectively. Turning to FIG. 2B a metropolitan network recommendation subroutine 222A is further illustrated. In step 226, the subroutine 222A is initiated. Next, in decision step 228, the subroutine 222A determines whether the user has chosen to implement a single channel network or wavelength division multiplexed (WDM) network. If a single channel network is selected, control passes from step 228 to step 230, where the subroutine 222A recommends SMF-28™ fiber. If a WDM network is chosen, control transfers from step 228 to decision step 232, where the subroutine 222A determines whether the 10F rings of the network are greater than 80 km. If so, control passes to step 230. Otherwise, control passes from step 232 to decision step 234, where the subroutine 222A determines whether the initial time division multiplexed (TDM) rate is 10 Gbit/s. If so, control transfers from step 234 to step 238, where the subroutine 222A recommends LEAF® fiber. Otherwise, control transfers from step 234 to step 236, where the subroutine 222A recommends MetroCor fiber™.

Moving to FIG. 2C a long haul network recommendation subroutine 212A is further illustrated. In step 242, the subroutine 212A is initiated. Next, in decision step 244, the subroutine 212A determines whether the user has chosen to implement an initial TDM rate equal to 2.5 Gbit/s. If an initial TDM rate equal to 2.5 Gbit/s is selected, control passes from step 244 to step 246. In step 246, the subroutine 212A determines whether the user chose to upgrade to a higher rate in the future. If so, control transfers from step 246 to decision step 250. Otherwise, control transfers from step 246 to step 248, where the subroutine 212A recommends SMF-28™ fiber. In step 250, the subroutine 212A determines whether the user chose an initial cable capacity less than 40 Gbit/s. If so, control transfers from step 250 to step 248, where the subroutine 212A recommends SMF-28™ fiber. Otherwise, control passes from step 250 to step 252, where the subroutine 222A recommends LEAF® fiber.

Figure 3:
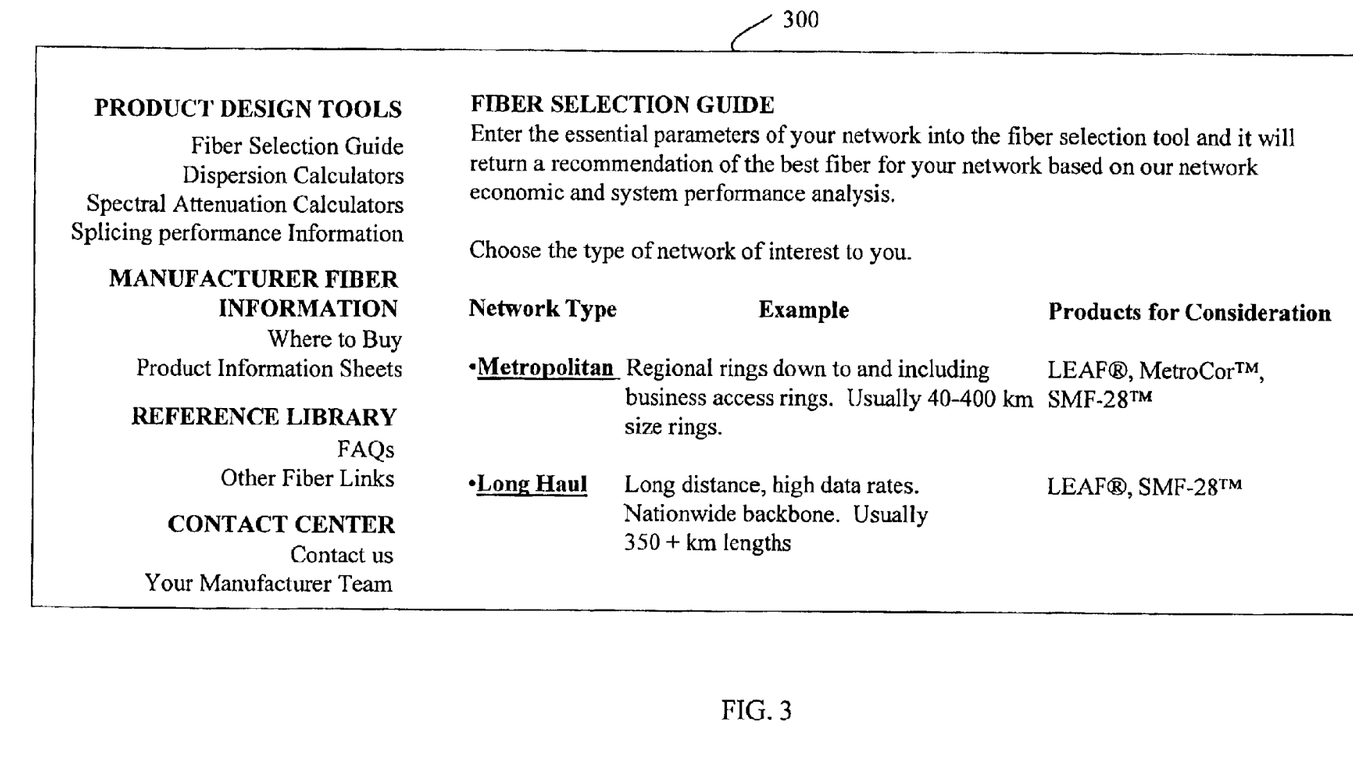
FIGS. 3, 4A, 4B and 5 are exemplary web pages that implement a user interface for the optical fiber selection routine of FIG. 2A.
Figure 4A:
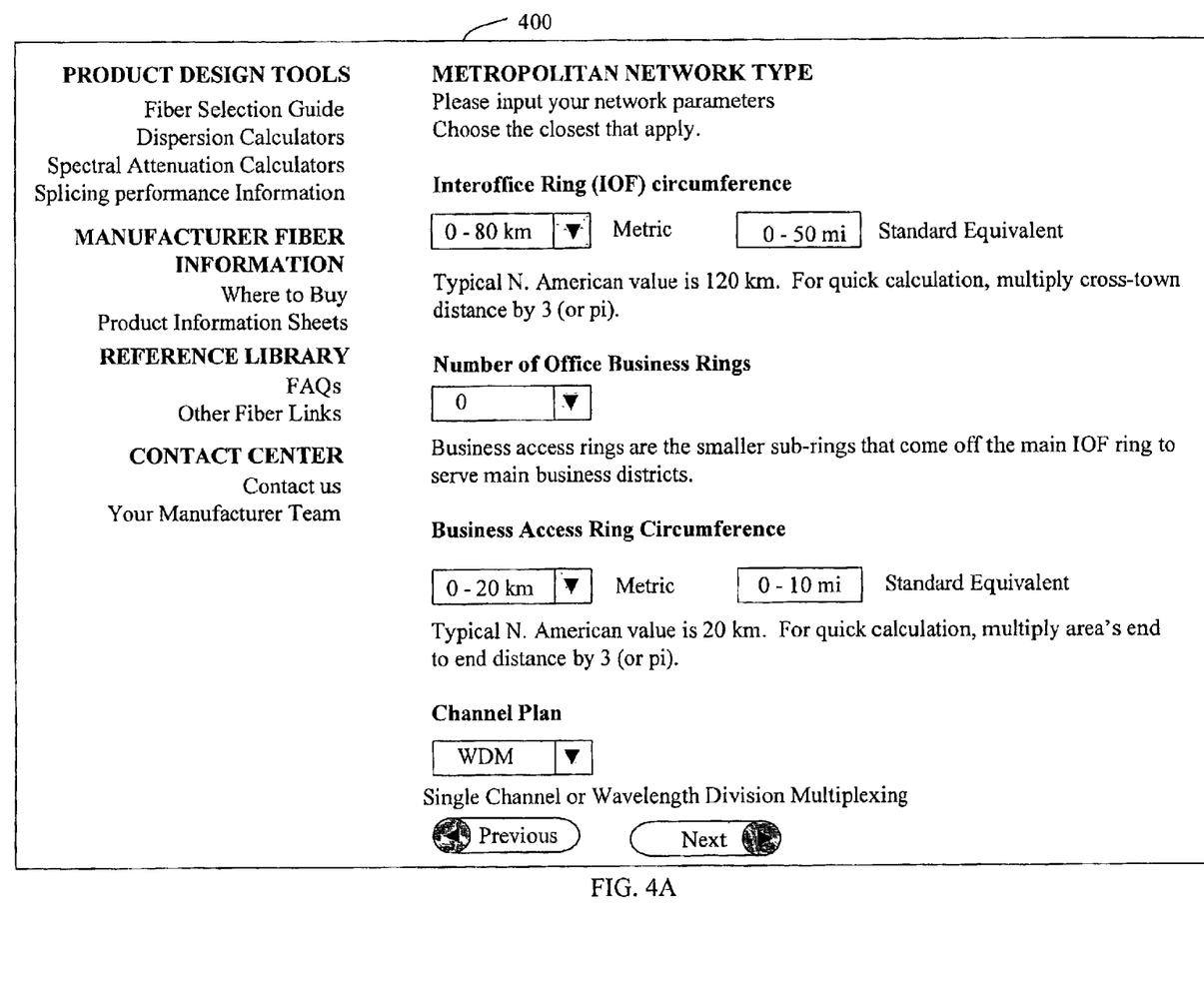

FIG. 3 depicts an exemplary optical fiber selection guide web page 300, that is typically displayed after an authorized user logs into a manufacturer web site and selects the fiber selection guide link. As shown in FIG. 3, the web page 300 allows a user to select either a metropolitan or long haul network type. If the metropolitan link is selected, a metropolitan network type web page 400 (see. FIG. 4A) is displayed. The user can then modify various default network parameters by selecting an appropriate drop-down box.

Figure 4B:
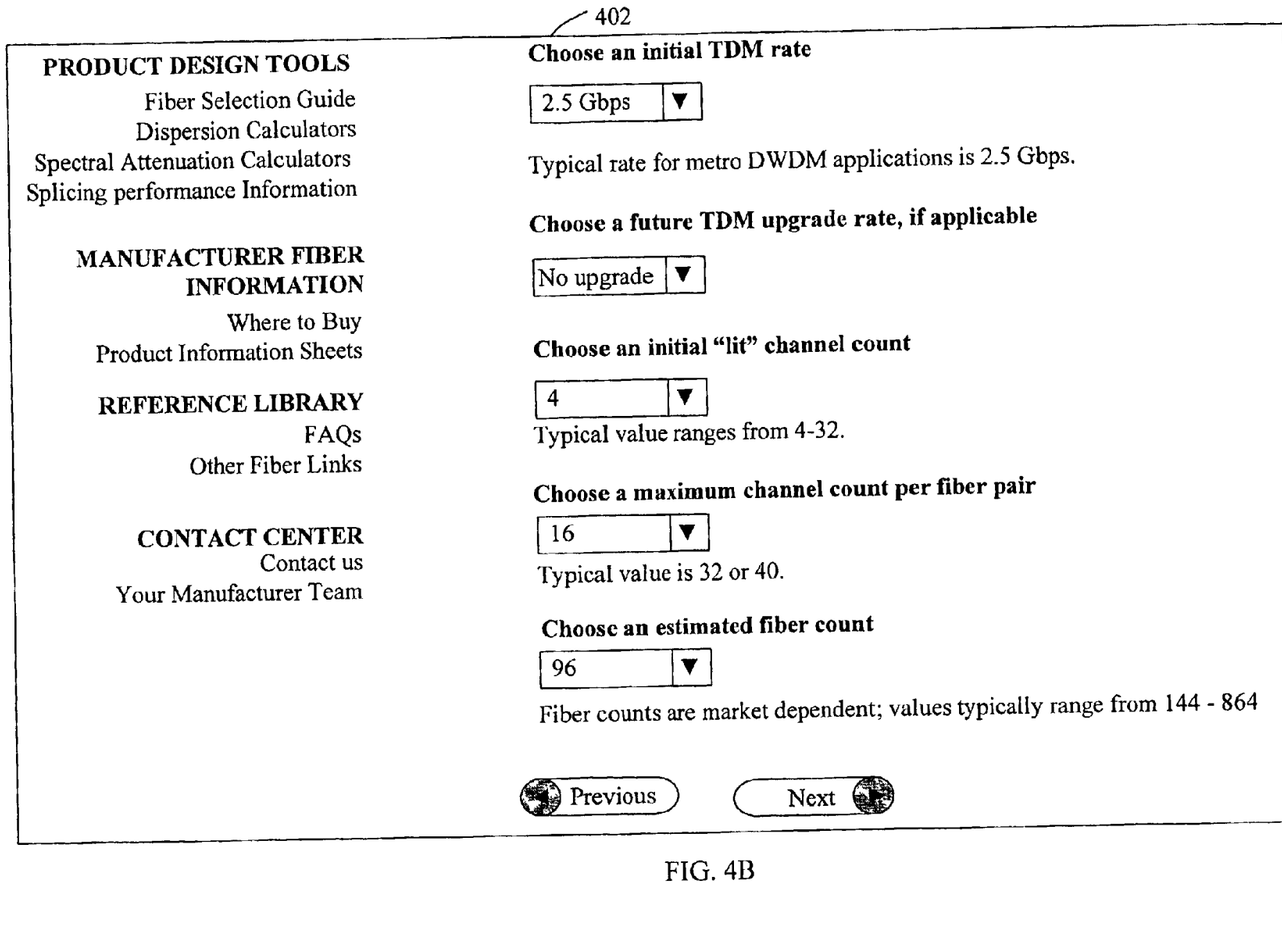
Figure 5:
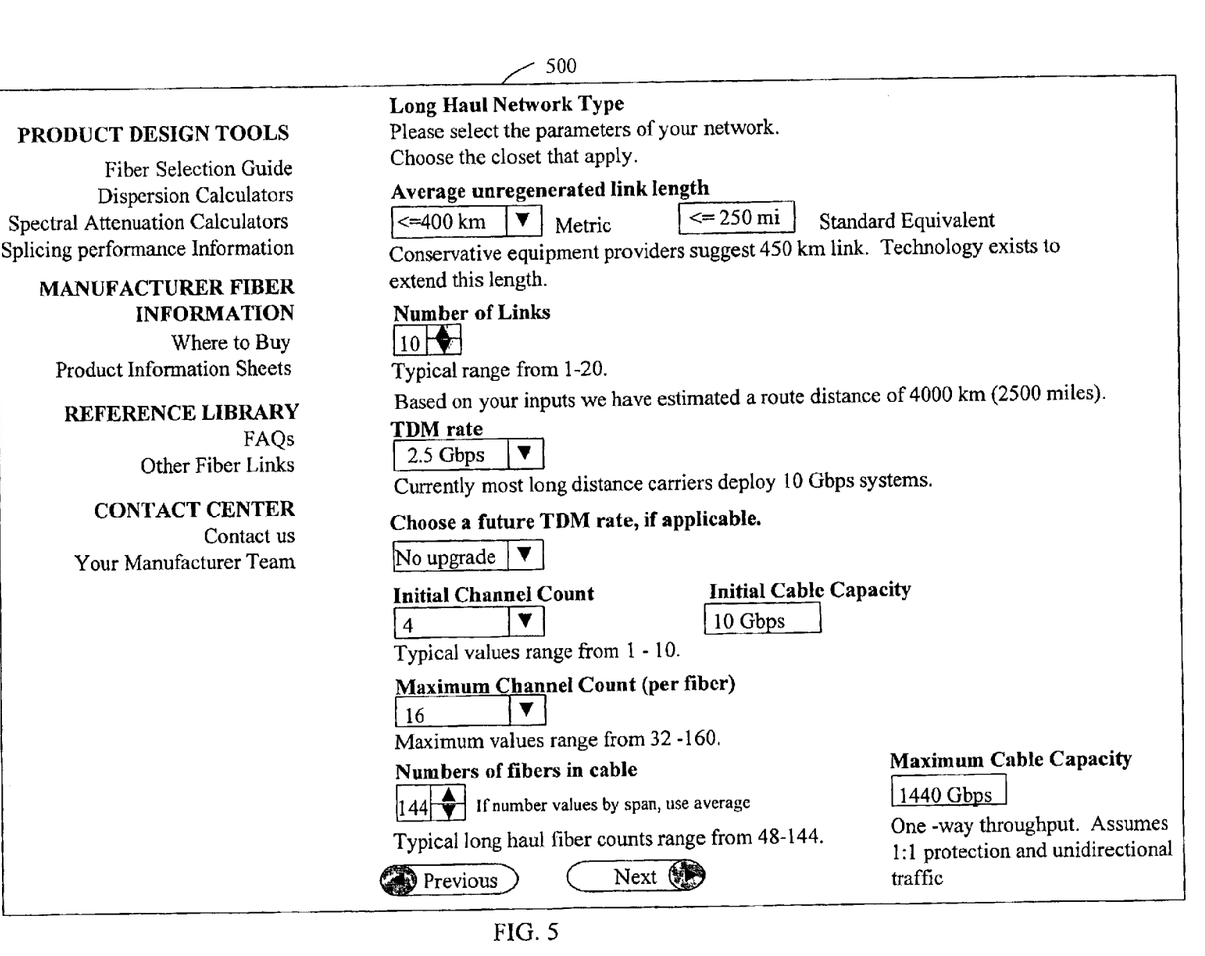

For example, as shown in FIG. 4A, a user can change the interoffice (IOF) ring circumference, a number of office business rings, a business access ring circumference and a channel plan. The user can then return to the fiber selection guide web page 300, by selecting a previous button, or go to a next web page by selecting a next button. When a WDM channel plan is chosen and a user selects the next button, a second metropolitan network type web page 402 (see FIG. 4B) is displayed. As shown in FIG. 4B, a user can change an initial TDM rate, choose a future TDM upgrade rate, choose an initial "lit" channel count, choose a maximum channel count per fiber pair and choose an estimated fiber count. When a single channel plan is chosen and a user selects the next button, a third metropolitan network type web page (not shown) is displayed. The third metropolitan network type web page preferably allows a user to choose an initial TDM rate, a future TDM upgrade rate, an initial "lit" fiber count, an estimated fiber count and an operating wavelength. When a user selects a next button from the metropolitan network type web page 402 or the third metropolitan network type web page, the fiber selection routine provides a selected optical fiber type in a metropolitan type selection web page (not shown). The user can also select a previous button from the metropolitan network type web page 402 or the third metropolitan network type web page and return to the web page 400, where the user can then change the parameters associated with the web page 400.

Referring again to the fiber selection guide web page 300, shown in FIG. 3, when a user selects the long haul link, the long haul network type web page 500 (see FIG. 5) is provided. Utilizing the web page 500, a user can then change an average unregenerated link length, a number of links, a TDM rate, a future TDM rate, an initial channel count, a maximum channel count (per fiber) and a number of fibers in a cable. When a user selects a next button from the web page 500, the fiber selection guide provides a selected long haul network type in a long haul network type selection web page (not shown). Alternatively, a user can return to the fiber selection guide web page 300 by selecting a previous button from the web page 500. The web pages shown in FIGS. 3, 4A, 4B and 5 are exemplary and are shown merely for illustration of appropriate user interfaces. It should be appreciated by one of ordinary skill in the art that various other types of interfaces, network parameters, network types and optical fiber types can be readily implemented, if desired.

As shown in FIG. 3, the product design tool preferably also provides a dispersion calculator and a spectral attenuation calculator. A suitable method for determining the spectral attenuation of a given optical fiber is known as the "Hanson Predictive Matrix Method," which is described in U.S. Pat. No. 5,534,994, which is hereby incorporated herein by reference in its entirety. The dispersion calculator preferably electronically provides at least one of a wavelength dependent dispersion value, a graph of dispersion over a wavelength range and a specification for the selected optical fiber type to the user. The spectral attenuation calculator preferably electronically provides at least one of a wavelength dependent attenuation value, a graph of attenuation over a wavelength range and a specification for the selected optical fiber type to the user.

Accordingly, an optical fiber selection system and method have been described, which automatically selects an appropriate optical fiber type for a communication network, based on input from a user. Initially, at least one technical parameter that is associated with the proposed communication network is electronically received from a user. Next, an optical fiber type for the communication network is recommended based on the at least one technical parameter. Finally, the recommended optical fiber type is electronically provided to the user. The above described system and method advantageously reduces the cost and the amount of time associated with selecting an appropriate optical fiber type for a proposed communication network.

It will become apparent to those skilled in the art that various modifications to the preferred embodiment of the invention as described herein can be made without departing from the spirit or scope of the invention as defined by the appended claims.

What is claimed is:

1. A method for selecting an appropriate optical fiber type for a communication network, the method comprising the steps of:
   electronically receiving at least one technical parameter associated with a proposed communication network from a user;
   automatically selecting an optical fiber type for the communication network based on the at least one technical parameter; and
   electronically recommending to the user the selected optical fiber type to the user.

2. The method of claim 1, further including the step of:
   electronically receiving a network modeling request from the user.

3. The method of claim 1, further including the step of:
   electronically providing at least one of a wavelength dependent dispersion value, a graph of dispersion over a wavelength range and a specification for the selected optical fiber type to the user.

4. The method of claim 1, further including the step of:
   electronically providing at least one of a wavelength dependent attenuation value, a graph of attenuation over a wavelength range and a specification for the selected optical fiber type to the user.

5. The method of claim 1, wherein the communication network is a telecommunication network and the user is one of a competitive local exchange carrier (CLEC), a communication carrier and a service provider.

6. The method of claim 1, wherein the at least one technical parameter includes at least one of a network type, a network length, a network channel plan, a network data rate, a network upgrade data rate, an initial active network channel count, a maximum channel count, an optical fiber count, an average unregenerated link length and a link count.

7. The method of claim 1, wherein the network is one of a metropolitan network and a long-haul network.

8. An optical fiber selection system for automatically selecting an appropriate optical fiber type for a communication network based on input from a user, the system comprising:

a user computer system;

a vendor computer system in communication with the user computer system, the vendor computer system executing code for performing the steps of:

receiving at least one technical parameter associated with a proposed communication network from the user via the user computer system;

automatically selecting an optical fiber type for the communication network based on the at least one technical parameter; and recommending the selected optical fiber type to the user via the user computer system.

9. The system of claim 8, wherein the code is configured to allow the vendor computer system to perform the additional step of:

receiving a network modeling request from the user via the internet.

10. The system of claim 8, wherein the code is configured to allow the vendor computer system to perform the additional step of:

providing at least one of a wavelength dependent dispersion value, a graph of dispersion over a wavelength range and a specification for the selected optical fiber type to the user.

11. The system of claim 8, wherein the code is configured to allow the vendor computer system to perform the additional step of:

providing at least one of a wavelength dependent attenuation value, a graph of attenuation over a wavelength range and a specification for the selected optical fiber type to the user.

12. The system of claim 8, wherein the communication network is a telecommunication network and the user is a competitive local exchange carrier (CLEC), a communication carrier and a service provider.

13. The system of claim 8, wherein the at least one technical parameter includes at least one of a network type, a network length, a network channel plan, a network data rate, a network upgrade data rate, an initial active network channel count, a maximum channel count, an optical fiber count, an average unregenerated link length and a link count.

14. The system of claim 8, wherein the network is one of a metropolitan network and a long-haul network.

15. The system of claim 8, wherein the vendor computer system and the user computer system communicate via one of a dial-up connection, a local area network (LAN) and the Internet.

16. An optical fiber selection system for automatically selecting an appropriate optical fiber type for a communication network based on input from a user, the system comprising:

a database including information on a plurality of optical fiber types;

a vendor computer system, the vendor computer system executing code for performing the steps of:

receiving at least one technical parameter associated with a proposed communication network from the user;

automatically selecting one of the plurality of optical fiber types from the database for the communication network based on the at least one technical parameter; and recommending the selected optical fiber type to the user.

17. The system of claim 16, wherein the code is configured to allow the vendor computer system to perform the additional step of:

receiving a network modeling request from the user via the internet.

18. The system of claim 16, wherein the code is configured to allow the vendor computer system to perform the additional step of:

accessing the database and providing at least one of a wavelength dependent dispersion value, a graph of dispersion over a wavelength range and a specification for the selected optical fiber type to the user.

19. The system of claim 16, wherein the code is configured to allow the vendor computer system to perform the additional step of:

accessing the database and providing at least one of a wavelength dependent attenuation value, a graph of attenuation over a wavelength range and a specification for the selected optical fiber type to the user.

20. The system of claim 16, wherein the communication network is a telecommunication network and the user is a competitive local exchange carrier (CLEC), a communication carrier and a service provider.

21. The system of claim 16, wherein the at least one technical parameter includes at least one of a network type, a network length, a network channel plan, a network data rate, a network upgrade data rate, an initial active network channel count, a maximum channel count, an optical fiber count, an average unregenerated link length and a link count.

22. The system of claim 16, wherein the network is one of a metropolitan network and a long-haul network.

23. The system of claim 16, wherein communication between the vendor computer system and the user is facilitated by web pages.

* * * * *